United States Patent

Bhukhanwala

[11] Patent Number: 5,831,617
[45] Date of Patent: Nov. 3, 1998

[54] BROWSING AND MANIPULATING OBJECTS USING MOVIE LIKE ICONS

[76] Inventor: Saumil A. Bhukhanwala, Attn: Julie Harders, 3113 NE. Briarwood Dr., Ankeny, Iowa 50021

[21] Appl. No.: 755,161

[22] Filed: Nov. 22, 1996

Related U.S. Application Data

[60] Provisional application No. 60/007,607, Nov. 27, 1995.
[51] Int. Cl.⁶ ..................................................... G06F 3/00
[52] U.S. Cl. ......................... 345/349; 345/473; 345/977; 707/511
[58] Field of Search ................................... 345/326–358, 345/473–475, 977; 707/511

[56] References Cited

U.S. PATENT DOCUMENTS

| | | | |
|---|---|---|---|
| 5,065,347 | 11/1991 | Pajak et al. | 345/348 |
| 5,202,961 | 4/1993 | Mills et al. | 345/328 |
| 5,276,795 | 1/1994 | Hoeber et al. | 345/353 |
| 5,287,447 | 2/1994 | Miller et al. | 345/342 |
| 5,301,348 | 4/1994 | Jaakelainen | 345/348 X |
| 5,303,388 | 4/1994 | Kreitman et al. | 345/355 |
| 5,479,602 | 12/1995 | Baecker et al. | 345/349 |
| 5,499,330 | 3/1996 | Lucas et al. | 345/349 X |
| 5,524,195 | 6/1996 | Clanton, III et al. | 345/327 |
| 5,546,529 | 8/1996 | Bowers et al. | 345/348 |
| 5,680,563 | 10/1997 | Edelman | 345/348 |
| 5,682,326 | 10/1997 | Klingler et al. | 345/328 |
| 5,682,511 | 10/1997 | Sposato et al. | 345/353 |
| 5,715,416 | 2/1998 | Baker | 345/349 |
| 5,724,492 | 3/1998 | Matthews, III et al. | 345/355 X |
| 5,745,713 | 4/1998 | Ferguson et al. | 345/339 |

OTHER PUBLICATIONS

Tonomura et al., "Content Oriented Visual Interface Using Video Icons for Visual Database Systems", IEEE, pp. 68–73, 1989.

*Primary Examiner*—John E. Breene

[57] ABSTRACT

A method to access appropriate versions of files or objects in a computer with a graphical user interface. The invention creates a container "movie" object which "contains" a user or program selected group of contained objects—which are typically versions of a file, data at different stages in processing or any other set of files which are temporally related. Since such temporally related objects are usually accessed "one at a time", the container displays within itself an icon for only one of the contained objects—typically the most recent or currently active file. The other non-active versions are kept hidden, to prevent accidental access and reduce visual clutter. To access any of these hidden versions, a method is disclosed which forces the user to "rewind" or "forward" in a movie like fashion to the past or recent versions with an animation rate indicative of the date proximities between adjacent versions—thereby giving the user a "feel" for recency or newness. The user may change the active version during animation using a keystroke or pointing action. The major new effect of the present method is that when a plurality of movie icons are browsed the computing environment or file system can be made partially reversible, assisting users to revert back and allowing programs to access older files or drivers which were known to be stable.

12 Claims, 5 Drawing Sheets

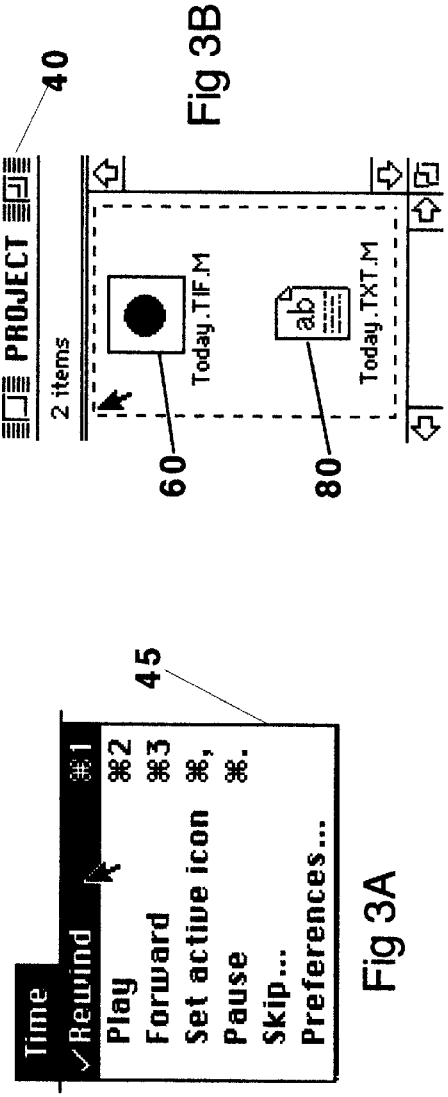
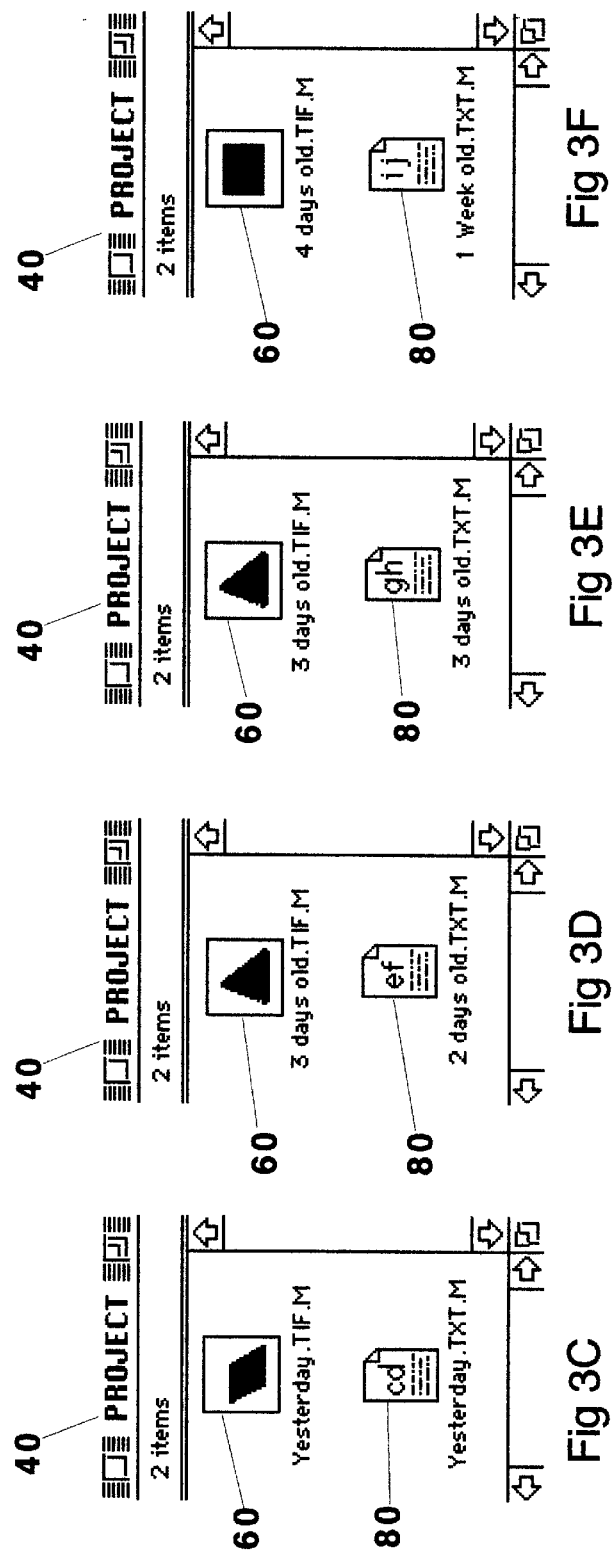

BROWSING AND MANIPULATING OBJECTS USING MOVIE LIKE ICONS

This application claims priority from provisional application 60/007,607, filed Nov. 27, 1995.

BACKGROUND

1. Field Of Invention

This invention relates to icons on graphical user interfaces (GUIs) and how they may be improved to reference data on computer file systems, personal digital assistants, and external storage devices such as CD-ROMs, removable disks, tape, etc.

2. Description Of Prior Art

Graphical user interfaces are common in computers and electronic devices for user interaction. Files, storage media, and devices are represented as icons. The icons preferably contain a miniature graphic representing the object. For instance, an image file can contain a small preview of the image itself—to enable easier identification. A disk icon may have the shape of a floppy. The icons make it easy to access objects—rather than simply searching file names.

Inspite of the intuitive benefits of icons, interfaces lack visual tools to manage icons effectively. For instance, icons of files can easily be scattered around the interface—thereby making it difficult to "visually" locate them. This defeats the basic purpose of a visual interface. Icons may be gathered or grouped into "folders" or "directories" to reduce the cluttering and provide an organized way for both users and applications to access files. But even folders do not effectively, isolate the important files from the unimportant ones, unless sub-folders are created. My invention is a method—whereby users as well as applications can avoid referencing "unimportant or non current" files and objects accidentally.

Most files have different versions or a sequence of files from different stages of a project, which need to be accessed "one at a time". The importance of each of these versions can therefore be frequently associated with their temporal relation in the sequence. The present invention provides an intuitive method to get a "feel" for temporal relations of icons and eventually aid in referencing appropriate files. The proposed method is also very effective in enabling programs to reference the correct version of a file from a group of temporally related files.

Summary Of Present Invention

This invention is a method to access a specific file or an iconic object from a group of objects and also to prevent accidental access to other objects in the group. This is done by using a "container" icon called movie icon, which "contains" a group of temporally related objects within it. The user must specify a list of objects that must be grouped as temporally related to form a movie icon. Alternatively, a program may automate this process of grouping objects into a movie icon, with or without user interaction.

The idea is to browse these temporally grouped icons in an intuitive movie like manner by "rewinding" to past object or "forwarding" to a more recent object. Typically, versions or multiple copies of a given file are ideal to be grouped as movie icons. Also, files and data at various input—output stages of a project can be grouped as movie icons. In short, a set of files which need to be accessed "one at a time" are well suited to be grouped as a movie icon.

Regarding prior art, movie icons are like "folders" or "directories", as they contain iconic objects within. But the difference is that a movie icon prominently displays within it only one of the contained icons which is usually the "active icon" and hides the rest—unlike folders which may display a group of files in scattered fashion within a window. But the major difference is, that in order to access file icons in a movie icon, the user is required to follow a temporal browsing sequence in an intuitive movie like fashion. This is not possible even when sorting a folder by date since that is merely a spatial organization and not a temporal rendering. Thus folders are a way to create spatial order but movie icons are used to create a temporal order.

Temporally related icons which are contained in the movie icon will be referred to frame icons—since they are displayed as frames of the movie icon when browsed. A frame icon is very similar to regular icons—which indicate file, folder or disk data, except that their validity and accessibility are associated with a time related reference. For purpose of discussion, we can restrict frame icons to files but with an understanding that the explanation can be extended to folders, disks or any other iconic objects on typical interfaces. Also, a frame icon may merely be a pointer or alias of a file—which may be offline or unavailable.

The "movie" icon may be "played" by a user or a program to a given frame icon—which may then be set as an active icon. When a user needs to access an older or newer version of that file, the user can "rewind" or "forward" the movie by a specified amount of time, so as to activate that version of the file. The primary advantage is that frame icons are navigated in an intuitive movie like fashion—with a certain sequence and tempo.

At any instance—either when a movie is playing or is paused, a movie icon prominently displays within itself, one frame icon. The user is therefore not bothered by a display cluttered with multiple versions of the same file or files from different stages of a project.

At the same lime another user or application which requires another version of that file can access any given frame icon by "browsing"—without actually affecting the active icon. Once the task is done the movie icon must display the active icon again. This way the user always references the active icon, by default—but applications which are "compatible" with the older versions still have access to older ones—by rewinding specific number of frame icons.

To enable a user to observe the temporal relations of other icons with respect to the active one, the movie icon when "played", must be animated in such a manner that the persistence of frame icons gives an intuitive feel for the date proximities of neighboring frame icons. Thus the time ratio of the movie can be set such that a day or a week (in the file system) corresponds to few seconds on playback time. Now if the user "rewinds" from the active icon—the older frame icons are sequentially displayed and persist for a number of movie frames which is in proportion to their date proximities.

The "track" on which frame icons of the movie icon, get displayed when browsed, will be referred to as an "icon track". A plurality of tracks can be added to a movie such as audio tracks, and comment tracks along with the icon track. The audio tracks can output speech information of properties of the icons or text comments could be displayed synchronously with icons. In fact, if the movie icon contains other container objects such as folders, there can be a plurality of icon tracks for each of the contained elements of that folder. Software driver "movies" may have secondary icon tracks for corresponding settings files or "Read Me" files. Since the present invention discloses a browsing method to essentially avoid clutter and provide improved feel for temporal relations of frame icons, we will limit the discussion to single track movie icons but with the understanding that the method can easily extended to include multiple tracks, if required.

In prior art, there has always been attempts at increasing the information presented through icons. In U.S. Pat. No. 5,303,388 to Apple Computer, Inc. (1994), three dimensional icons with multiple faces display different properties of an object. By adding a spatial dimension a user gets size, date, file type, etc., information simultaneously, on different faces (when viewed at different angles). But in the present invention, the movie icon enables reducing information, by hiding icons. In effect it optimizes spatial distribution of icons by adding a temporal dimension. For instance, if a user saves 3 versions of a file using a "Save As" command, then in conventional interfaces, 3 separate icons would represent each file. In the present invention, this could be represented as one unified movie icon—with 3 frame icons, preferably the most recent one of would be an active icon.

In U.S. Pat. No. 5,287,447 to International Business Machines (1994), a non-container object has been given the attributes as if it were a container object, using an associated container pane. The present invention, also involves a concept wherein the division between container icon and the contained is not rigid—but in this case it is the container icon which is made to behave as if it is a contained item. For instance, the movie icon (the container) may be considered equivalent to the active icon (the contained). This means that an open command or double clicking the movie icon can be designed to launch the active icon file. Equivalence for purpose of file referencing is preferred—since only one icon is set as active.

The concept of animating an icon is found in U.S Pat. No. 5,301,348 to International Business Machines (1994), in which a dynamic progress marking icon, indicates the fraction of a task completed, by updating the pattern within the icon. The present invention also animates the movie icon but the purpose is to browse a sequence of contained items as a movie. The dynamic marking icon is not a means to access files or objects but only a way to avoid progress bars and messages.

In U.S. Pat. No. 5,479,602 to Apple Computer, Inc. (1995), icons depict the content of an object. The depictions can be animated as well. But this animation is used only to enhance depiction of that object. Animation is not used to provide a feel for temporal proximities of different objects nor is it a way of preventing accidental access to other non-active objects. In short, animation is not a file organization tool, but an improved way to recognize objects.

Objects And Advantages a) By integrating time related icons into one unified movie icon, the display can be immensely simplified—since the user now sees only one frame icon. The active icon will usually be the most recent file icon. Browsing through the older or newer versions of a file becomes intuitive like browsing movies. This "feel" for time and sequence is further emphasised when browsing multiple movie icons at the same time—and co-existence of icons from different movies at various time stages can be seen simultaneously.

b) The other significant advantage of a movie icon is that it prevents accidental access to the non active files. This is due to the fact that the movie icon hides non active frames icons—and sequential browsing forces the user to observe one icon at a time. The strength of the movie icons lies in the fact that at a given time, users usually access only one version of a file or a file in a specific stage of a project—in mutual exclusion to other versions or stages. And in cases when more than one version needs to be accessed, then browsing in sequence is a better way to select them, rather then search scattered icons within a folder.

This advantage of preventing access to non active files is also applicable to programs or software which must access the correct version of a file for further processing or printing etc.

c) Some applications may be compatible with an older version of a driver software. It is usually complex to manage which program uses which version of a driver. This management can be improved since programs which use older versions of drivers, can just "rewind" the driver "movies"—rather than search for correct version. Usually, the programs will access the active icon (explicitly or implicitly), but some additional abilities can be added to programs to decide when to "rewind" to an older version to be "safe than sorry".

d) Movie icons need not just integrate versions of the same file, but can integrate files from different stages in a project. If a file f1 is input to a process and f2 is the output, which is further pipelined to give f3, f4. . .fn, then a movie icon can be created with frame icons of f1. . .fn. If the batch process is scheduled and predictable, then the movie can also be forwarded into the "future", by creating alias or virtual files which will be formed.

e) Movie icons will also aid in system administration and utilities. For instance, a system program can automatically compress the files of the icons which are found by rewinding a certain period "back in time". This can be done since these files may be older versions or backups which may not be used frequently. If there were no movie icons, then it would be difficult to compress a file simply because it is old—since it may well be the only or most recent version of a file and actively in use by programs etc.

Also compression utilities or the application which saves the file may compress files in relation to the temporal sequence. Since versions may be similar, only the differential component with respect to a previous frame icon may be saved.

f) The temporal relation of movie icons can be useful for backing data. Most backup program use the date information of files to determine if they must be backed up. Programs may forward a movie icon from the point last backed up to the current stage to determine if backup is necessary.

g) Temporally related versions of a file need not all reside on the same storage device or directory. In fact, most often users store an old version off-line. This scattering of files is most confusing to users and eventually leads to accessing the wrong file. In such a case, a movie icon may be created with frame icons which are aliases or pointers to the scattered files. This gives the user a central access point for all the scattered files. Also some of the versions may have been deleted and may be only on a sequential backup device such as a tape. Movie icons take the concept of aliases (as in Macintosh® computers) a step further.

h) Different program files which perform similar tasks can be represented using movie icons as follows. The program which is most frequently used can be made an active icon, whereas the program which is sparingly used, can be given a virtual or temporary date in such a manner so that it is at a distant date proximity from the active icon.

For instance, deleting a file may be defined in three stages—moving it into a trash icon, actually physically deleting it, and then if needed "shredding" it. (shredding ensures that no program can recover even a trace of the deleted file). Lets see how this trash icon can be represented as a movie icon.

If an object is held over the trash icon—say, for a second, then the icon movie begins to "play". If the user continues to hold onto the trash (another 3 to 4 seconds), the movie keeps playing into the next frame icon—which represents the file deletion program. If held over the trash for say 10 seconds, then the movie displays a frame icon for a "shredder" program. Now if the user finishes the drag operation—by dropping the object onto the trash, then it can be shredded. Usually such actions require modal dialogs, warnings or modifier keys to ensure that the user is aware of the data loss possible. The movie icon which separates these file trashing programs temporally, ensures that the user is aware of drawbacks—by forcing time delays instead of complex dialogs.

Thus movie icons can group programs which perform similar tasks and at the same time separate them temporally to achieve different priority. Moreover, the system administrator can change the temporal proximities or even make sure that the movie never plays more than 3 seconds into the "future frames"—thereby prohibiting the novice or unauthorized users from adverse operations.

i) One of the most significant effects of movie icons is that, the computer could be made partially or completely reversible—a feat which could enable users go "back in time of the computer's universe of files and objects". This can be possible if a) Every icon is a movie icon, b) Files are not erased (they may be "virtually" deleted but should be recoverable either from the current file system or other backup), and c) every time a file is saved, it does not overwrite the file, but adds to the movie icon of that file. ( Thus a "save" command is like a "save as"). In other words, it should be possible to "rewind" every movie icon back to a specific time in the history of the computer's universe (of files and objects). This type of movie icon which comprises of all (or most) past versions of that file as frame icons, either available directly or deleted (but backed up off-line), can be referred to as a reversible movie icons. (I plan to cover this possibility of a "Reversible file system using movie iocns" in a future patent application)

It seems impractical—due to limits on storage space, that no files be deleted and every version of each file on the computer be saved. But a partially reversible system is definitely possible, given that the cost of media keeps reducing. A partially reversible computer could be implemented by making only a subset of the files or (some projects rather than the entire universe) as reversible movie icons. Also, the reversible movie icons could hold files only at certain "moments" or regular intervals of time rather than every saved version.

A partial reversible system could be implemented for say only the operating system related files such as versions of drivers, preferences, etc. If upgrading created conflicts, then reverting back to a known past healthy state is easy. The same applies to users who mess up a project and need to go back a few steps. Actually, users are always re-creating previous file or directory states from backups—but in a totally unplanned way—which leads to doubt and frustration. It must be mentioned, that aliases on Macintosh® computers have the ability to reference off-line storage already, just that the integrity of which version to recover falls on the user or the back-up utility.

j) Just as a reversible machine is possible, based on availability of storage space and regularity of backups, in some cases, files or projects could be advanced into the "future". All though the file data for such files do not exist, their existence and properties such as estimated size, could be predicted based on scheduled scripts. Also, the developer of a specific driver or software may have announced an expected date of release. For all such "yet to be created files", virtual frame icons, which refer to future dates, can be placed in the movie icon.

DESCRIPTION

FIG. 1A: Prior Art

In FIG. 1A, a screen 10, of a computer or a electronic data processing device with a graphical user interface is shown with three icons of picture files 20, 22, 24 . File 22 and 24 are created by modifying file 20, and using "Save As" in an image editing program. These files are needlessly cluttering the screen 10, as typically only one of these versions will be approved for a final design layout. Even if each of the files are equally important, they are usually dealt with one at a time and in order of recency. In prior art the only major tool available is a directory or folder to group these files. But such grouping does not eliminate clutter, as opening the folder reveals all the cluttered file icons.

FIG. 1B: Present Invention

The scattered icons files 20, 22, 24, are replaced by a container movie icon 26, eliminating clutter. This grouping is done by a user or application program, which determines temporal relations. Within the movie icon is displayed a frame icon for one of the contained files 20, 22, or 24. Only one frame icon is displayed and is visually identical or similar to the icon of the file referred to. Frame icon 21, 23, 25 correspond to file 20, 22 and 24 respectively. Further, to access adjacent files, a user has to rewind or forward using a panel 30, on the movie icon. A position indicator 32, indicates "how far back in time or into the future" the current frame icon is. File naming is not shown in the figure for clarity, but appropriate naming convention must be used depending on the operating system.

It must be emphasized, that visual clues such as 30 and 32 which make the icon look like a movie icon are not essential but are preferred. 30 and 32 may be omitted for a novice user level who need not rewind a movie icon but system administrators can browse using keyboard and pointing actions.

FIG. 2A: Cluttered Files In A Project Window (Prior Art)

In FIG. 2A, are shown four Graphics files 50, 51, 53, 54 and five text files 70, 71, 72, 73, 77 in a "Project" folder window 40. The files are cluttered but may be "cleaned up" or arranged and sorted in date order but still the user will not get a feel of date proximities of adjacent frame icons. Also, random access to any of the files will not be prevented, unless grouped as movie icons as in FIG. 2B.

FIG. 2B: Movie Icons, Alternate Embodiment

In the present invention, the user has grouped graphic files 50, 51, 53, 54 to a movie icon 60 and the text files 70, 71, 72 73, 77 to movie icon 80, in the same "Project" window 40. The most recent files 50 and 70 are set as active icons of movie icons 60 and 80 respectively. The file names such as "Today.TXT" "Yesterday.TXT", etc., and file extension ".M" for movie icons are for convenience only. Such names are typically not required on computers such as Macintosh®.

In this embodiment the panel 30 and position indicator 32 have been omitted—to illustrate that these are not really necessary, since browsing can be controlled through menus or keyboard commands. The immediate advantage of the movie icon can be perceived as other file icons of FIG. 2A are hidden, but readily available through browsing as shown in FIG. 3B. If the user double clicks imovie icon 60 the file "TODAY.TXT" 50, is opened—preventing the user from launching older or non active versions.

FIG. 3A: An Example Menu For Browsing A Movie Icon

FIG. 3A shows some of the functions of browsing that could be accessed through menus or keyboard commands, 4 5. As shown, the movie can be rewound (command-1) and then as it is animated, an active icon can be set if required (command-comma). Alternatively, it may be paused at a desired frame icon ( command-period) and then the active icon may be set or standard pointing actions could be directed to the displayed frame icon. To select frame icons while browsing, so that pointing actions could be directed to more than one frame icon, a modifier key such as "Shift" may be required to be held down. The time ratios can be set through a Preferences menu item . A "skip" menu item is provided as a shortcut for users to skip directly to a known frame position such as "oldest", "last" etc. Skipping is optional and as such is not a necessity for browsing.

FIG. 3B to 3F: An Example Browsing Of A Plurality Of Movie Icons

The movie icons 60 and 80, are selected in FIG. 3B and a "rewind" action is applied at a time ratio of 1 day/second. FIG. 3C, 3D, 3E, 3F show the movie icons at 1, 2, 3 and 4 seconds after the rewind action at FIG. 3B. Browsing a plurality of movie icons together at the same time ratio has an advantage of comparative temporal associations across movie icons not just the temporal relations of the frame icons within a movie icon. The user can now set an active icon or select files of a movie icon by comparing the frame icons in other movie icons. This strengthens the usefulness of temporal browsing—as one can go back in time with respect to contemporary files of an entire project not just a specific movie icon.

The time ratio of 1 day/second makes the movie icon go back into the past by a day after every second. After 1 second, FIG. 3C, the frame icons of 60 and 80 are displayed resembling those of 51 and 71 respectively. After 2 seconds, FIG. 3D, the graphics movie icon 60 resembles the file icon for 53, a 3 day old file, as this was the most recent existing file 2 days back in 60 (the file "Yesterday.TIF" is invalid 2 days back since it did not exist then). Similarly, after 4 seconds, FIG. 3F, the text movie icon 80, displays a frame icon resembling file 77, which was a week old but the most recent valid file 4 days back. If the movie were to continue after 5 seconds, the graphics movie icon may be "grayed out" to indicate that it no longer has any valid frame icons for that moment in time FIG., 5C

FIG. 4: Flowchart Of The Major Steps In Browsing A Movie Icon

FIG. 4 illustrates a browse command such as a rewind or forward on movie icon. The same method can be applied to a plurality of movie icons—assuming that the processing capabilities of the machine can handle rendering all the movies simultaneously. The time ratios must be pre-determined to suit rendering.

As the browsing begins 91, the initial frame icon is displayed based on an initial date—which is usually the date of the active icon but in some cases the movie browsing may actually start off at another frame icon (if many movie icons are browsed then some common initial starting date will be required). The direction of browsing is obtained in 92. This determines whether the movie "goes back in time" or "into the future" from the initial frame icon. The time ratio determines the number of days or hours in actual time, that each movie frame or unit time corresponds to.

At any time, a frame of the movie corresponds to an actual date. The actual date D, that the next frame of the movie refers to is computed in 93. This next D can be easily obtained by subtracting/adding the time ratio from/to the current value of D. (The addition or subtraction depends on the direction of browsing).

Once D is computed, then it is required to find the frame icon to be displayed, 95, in the next movie frame. This will be an icon from the list of frame icons in that movie icon—which would have been the most recent icon at that date D. To improve efficiency of 95 on slower machines, it may be desirable to pre-sort and store the frame icons in date order.

The obtained frame icon is displayed after a delay of unit time frame, 94. It must be understood that the after each unit time, the frame icon displayed need not be different from the previous one. Also, in practice, stages 93, 94, 95 may be slightly re-organized to execute in different order, as long as the frame icon displayed after each unit time is the correct one as computed in 95.

The important point is that the overall integrity of icon animation must conform to the dates D that an animated frame refers to. This flowchart is only one of the many ways to accomplish this and step 95 may be considered as the main step. For instance the entire movie rendering may be pre-computed for all the time frames at a given time ratio and the movie is simply played out during browsing. This can be done by pre-processing steps 93, 94, 95, 97 repeatedly, without displaying any frames and then storing the results as a ready to run movie-icon. This may impose a memory overhead but the movie can run "smoother" if time ratios are demanding (such as 1 hour/0.3 seconds).

Step 97 is only required if the time ratio is going to change as the movie goes on. At times, it is desirable to increase the time ratio as the movie goes on—since distant past or frame icons need not be observed at "finer" intervals. Modifier keys or pointing action or pressure change with stylus, etc., users can be used to control tempo of a movie after a quick start, to locate specific icons. In fact, if the time ratio is modified after each frame by an amount equal to the date proximity of the next frame icon in that direction, then a new icon—the adjacent frame icon, is displayed after each movie frame.

Step 96 checks if browsing is done. Essentially, 96 checks for user input such as a keyboard commands or pointing actions to abort animation, set a new active icon, to open the currently displayed frame icon, etc. The user may pause 99, to get better control for pointing, etc. The animation must wait till another user input resumes operation. Step 98 executes the necessary tasks in response to any user input related to the frame icon that was displayed. If a new active icon is set, this movie icon now references a corresponding new object. If no icons were selected or set as active then the movie icon is restored to its original icon.

SUMMARY, RAMIFICATION, AND SCOPE

The basic purpose of this invention is to provide a method to access a plurality of files and iconic objects on a computer which are grouped as temporally related, by creating an integrated movie icon—which preferably displays an active icon. The said movie icon can be browsed to sequentially display or access past or future frame icons, with a direction and tempo which give an intuitive "feel" for the date proximities of the adjacent frame icons.

The creation of movie icons can be automated when applications save files, or when system software copies files, etc. Such copies automatically could be added to the movie icon.

Figure 1A:
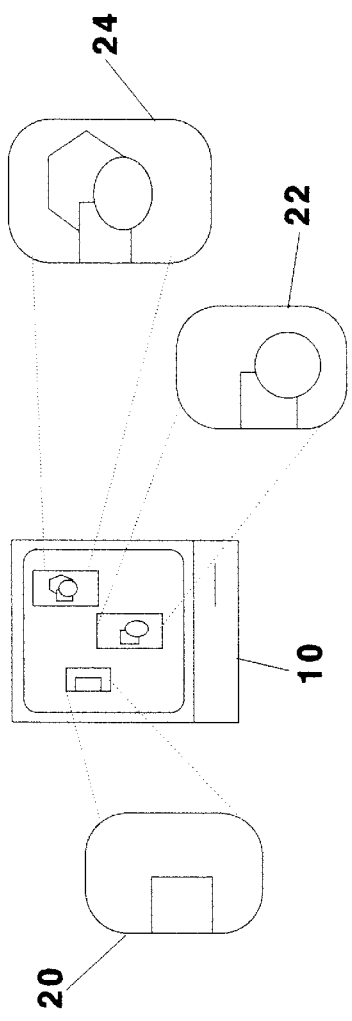
Figure 1B:
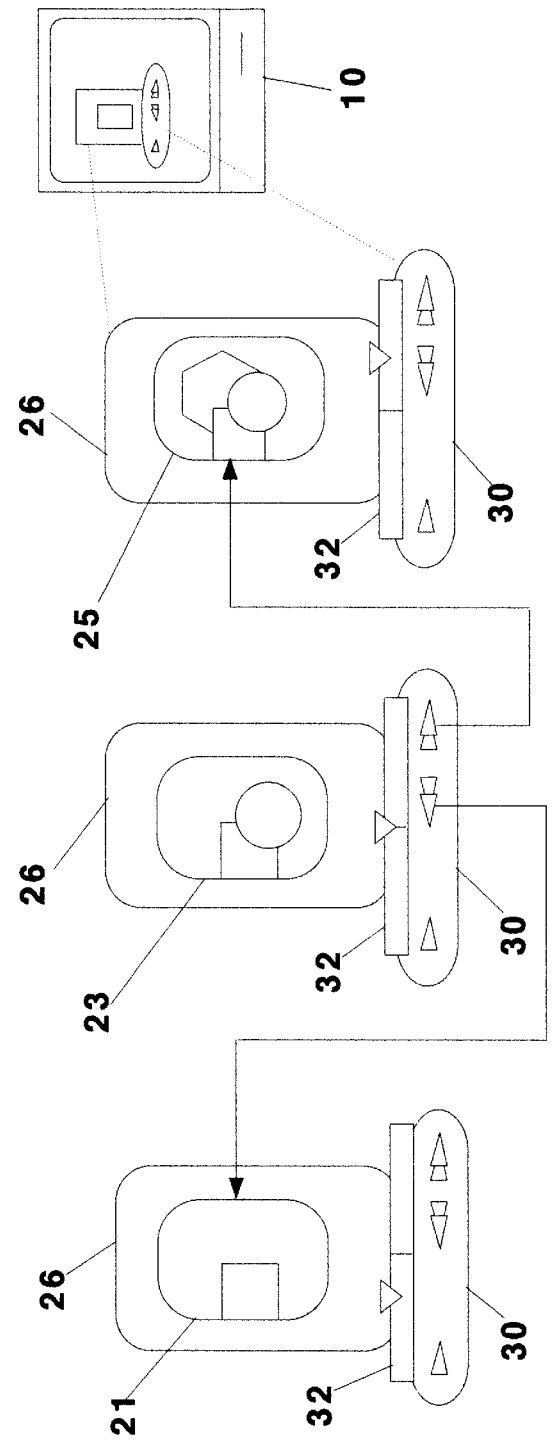
Figure 2B:
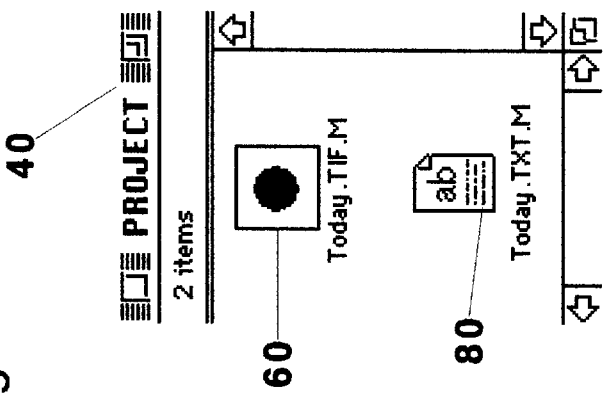
Figure 2A:
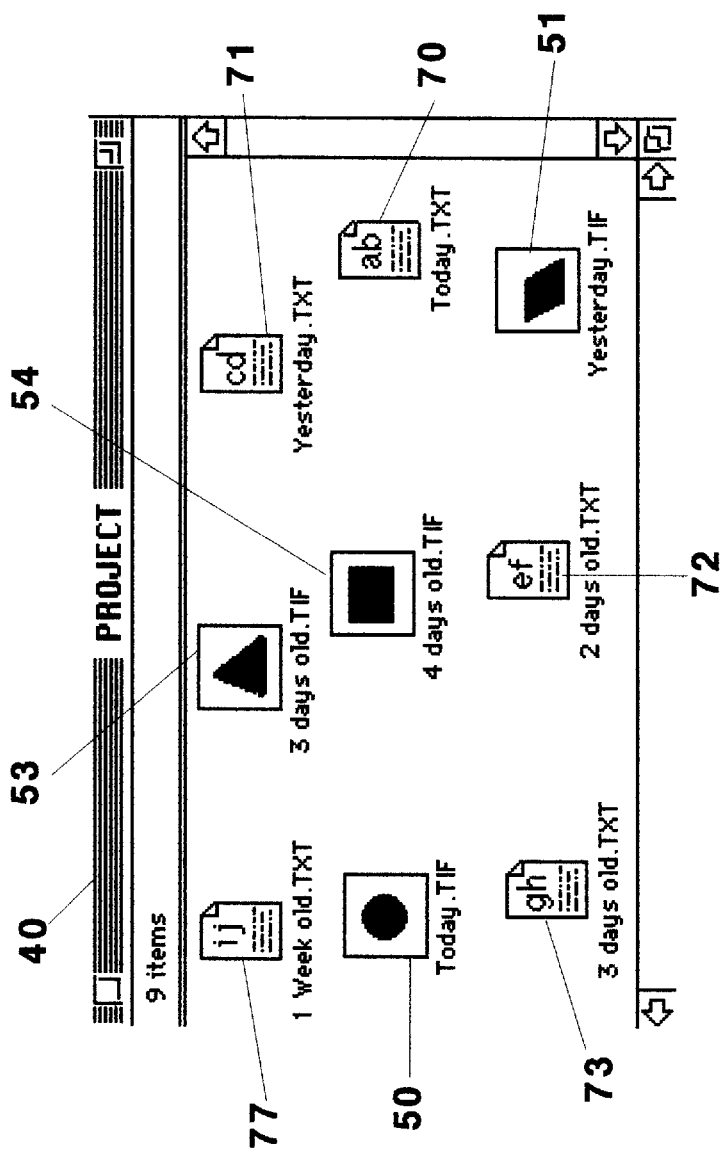
Figure 4:
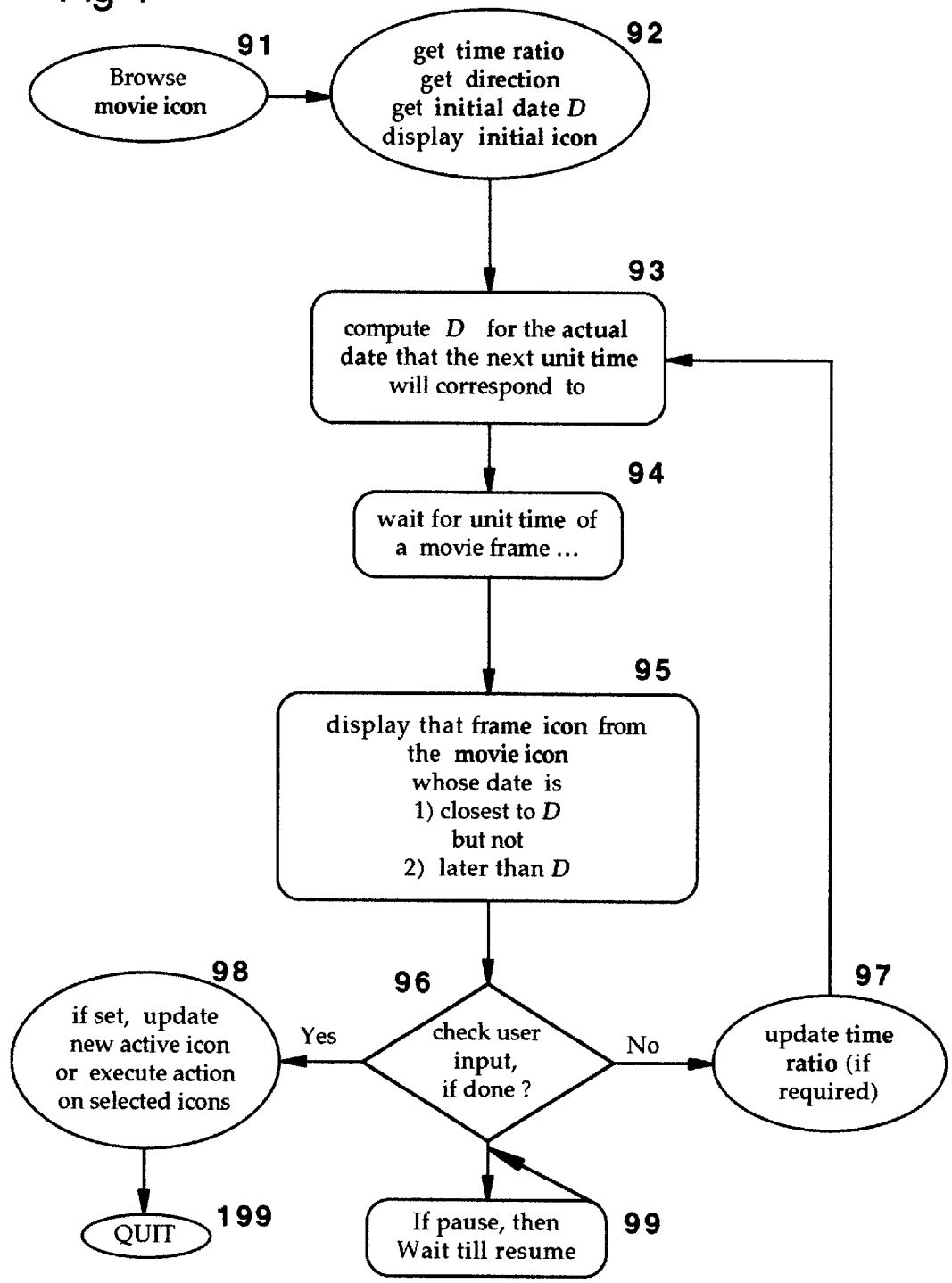
Figure 5A:
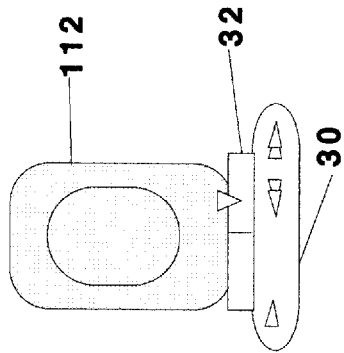
FIG. 5A illustrates an expanded view of a movie icon.

For certain system administration or special purpose, the movie icon can be modified to display an expanded view FIG. 5A. Preferably, only one frame icon must be displayed in the movie icon. But in some situations, it may be desirable to show the adjacent frame icons 101 or the first and last icons as well, but with lower visual priority than the current one 100. This way a system administrator can actually see how some past or future icons actually "enter" the present, 101. This is like a "storyboard" layout as in video editing programs which show an overview of frames or sections of the video clipping. There is no real modification required on the present invention to facilitate an expanded view—except the processing overhead of pre-calculating and displaying many frame icons simultaneously along with the current icon while browsing. If three frames need to be displayed simultaneously—the current, the previous frame and next frame, the method of FIG. 4 can be followed with storage modifications to "cache" and "queue" the displaying of 3 frames rather than discard results after each unit time. Even in this expanded view of the movie icon the present invention essentially is unchanged as there is still only one prominent icon and method of temporal browsing is maintained.

In future ramifications a movie icon may be rendered in many creative ways, as in expanded mode. The frame icons may be shown in a "notepad style" layout or a "3D type icon". The style is irrelevant, as long as one of the "sheets of the note pad" or "the front face of the 3D icon" is prominently displayed for easy access, and the "other sheets" are browsed or "other faces are rotated" in a sequence and timing which conforms to browsing constraints of the movie icon.

It was mentioned that a movie icon can be considered as equivalent to the active icon as far as file referencing. This is preferable but not essential. For instance, if a movie icon is dragged to the trash—should only the active icon be deleted or all the contained icons ? (as in folders). The same question is true for file transfers. This dual nature of interpreting the movie icon as a container and the contained (the active icon ) for commands or pointing actions is external to the invention, since in both cases the browsing method and role of movie icons the same—to provide easy access to an active icon and prevent accidental access of other frame icons.

For certain conditions when there are problems with system performance or when other platforms which do not support movie icons must share files, a simple utility could temporarily convert the movie icon to a folder or directory. This can be done by removing sequential browsing restrictions—and then creating a folder which comprises of frame icons contained in the movie icon.

Figure 5B:
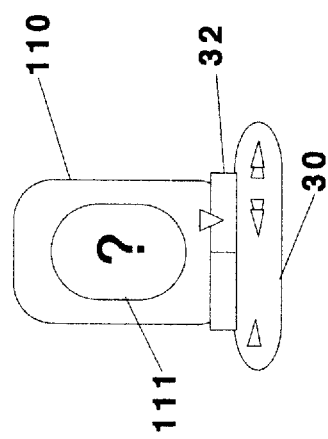
FIG. 5B illustrates a movie icon with a generic frame icon.
Figure 5C:
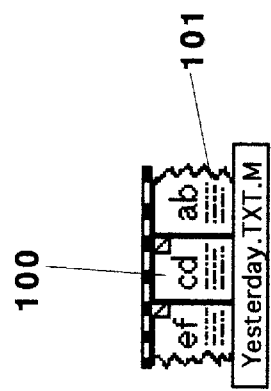
FIG. 5C illustrates a movie icon.

Also, there is lot of scope for programs to manipulate system files, drivers, etc., implemented as movie icons. Such movie icons are meaningful only to programs which may define active icons dynamically as required for compatibility, security etc. In such cases when a user need not be concerned about browsing a movie icon 110, a generic frame icon may be displayed 111 (FIG. 5B)—to indicate that an active icon is not predictable or is yet to be set by an program.

Terms Found In Prior Art a) Icon: A pictorial representation of a computer object such as a file or device—enabling the user to access data in a visually intuitive manner. The terms "icon" and the "object" represented, are used synonymously in this specification, for simplicity, since an icon refers to the object.

b) Movie: A sequence of time "frames" in which audio, video, or other time sensitive data is "played". Typically movies have a frame rate such as 15 frames per second—in which every second displays 15 distinct "frames" of time sensitive information.

c) Unit time: is a term used in this invention which refers to the time span of one frame of the movie icon when browsed. Thus if a movie plays at 15 fps (frames per second) then the unit time will be $\frac{1}{15}$ second.

d) Track: A movie can comprise of time sensitive data of different types such as audio, video, etc., at the same time, rendered on different "tracks".

Terms Relating To Invention a) Movie icon: An iconic object which integrates a list of temporally related icons of computer objects, which may be browsed like a movie—so that the object icons can be navigated in a sequence, with time intervals which relate to proximities of their dates. The purpose being to effectively and intuitively access past or future files which are time related, and also at the same time, to hide them when not required.

The object icons may be browsed manually movie like fashion or accessed indirectly by programs which refer to a frame icon number or the date of the object icons.

b) Frame icon: is a term used to refer to an object icon which is contained in a movie icon. The term "frame icon" is used, since these icons are displayed in individual "frames" when the movie icon is browsed. It is important to note that a given frame icon may persist for a plurality of "frames" when the movie icon is browsed, depending on date proximities. (in this invention the word "frame" when used without "icon" as the next word, refers to a "unit time" frame of the movie.)

c) Icon track: In the present invention, when the movie icon is browsed, the movie is said to possess one (or more) icon tracks—since the track/s displays "icons" in their frames.

c) Time ratio: When a movie icon is browsed such as in a "play" or "rewind" like manner, each "unit time" frame of the movie corresponds to an actual time span. Thus time ratio may be defined as the ratio of actual time span ( in terms of frame icon dates) per unit time (duration of each frame of the movie icon being browsed).

Thus a 1 second frame during a "rewind" may correspond to say 1 day in terms of frame icon dates. The time ratio in this instance will be 1 day/1 second. Time ratios of 1 day/1 second and say 12 hour/0.5 second are not completely identical. The latter would have a frame rate of 2 frames/second e) Current icon: At any instance the movie icon prominently displays one icon—the current icon. There may be few other icons displayed along with the current icon, in an expanded view. The current icon usually displays the "active icon"—the icon which is conveniently referenced by either users or applications. When the movie is browsed, other non-active icons get displayed as the current icon.

f) Date reference: In general the term "date" in this invention refers to the last modification date of that object. Thus when the temporally related files of a movie icon are sequenced in "date" order, or when the movie refers to a date reference D, it means the modification date.

At times, it is desirable for the user or program to browse frame icons of a movie icon based on say, the creation dates. Some versions of software drivers may be modified in an unpredictable order but created in order of the version. Thus a program which needs an "old" driver must rewind based on creation date. Similarly, the date reference may be the date of entry (when it was added to the movie icon)—since certain programs process data on a "first in first out" basis. To force a given sequence, there could be "virtual dates" imposed on the frame icons to meet project requirements. This invention can be thus be used with various types of date referencing, if required.

g) Date proximity: This term is used to denote the difference of dates of adjacent frame icons, when a movie is browsed in a given direction. The aim of browsing is to make apparent the "feel" of date proximities of frame icons in a movie icon or enable applications to locate the correct file versions.

I claim:

1. In a graphical user interface computer system, a method to access a specific object from a predetermined group of objects stored in a storage means accessible to the computer system, comprising the steps of
   a. executing a programmed means to animate icons of objects in the group within a container region on screen, in a sequence related to a date order, and upon detecting specific user input during animation
   b. to execute a programmed action related to the current animated icon, enabling access to past or recent objects in an intuitive movie like "rewind" or "forward" browsing manner and reducing visual clutter of the objects scattered spatially on screen.

2. The method of claim 1, wherein the icon animation has a time ratio such that a user gets a feel of temporal proximities between neighboring objects in the animation sequence.

3. The method of claim 1, wherein the icon animation displays an icon with a persistency indicative of separation in modification date of the current object animated and modification date of the next object in the animation sequence.

4. The method of claim 1, wherein the icon animation has a sufficiently slow speed to enable a user to perform pointing actions related to the current icon animated.

5. The method of claim 1, wherein the icon animation programmed means has an ability to pause animation upon specific user input, to enable a user to perform pointing actions related to the current icon animated.

6. The method of claim 1, wherein the animation time ratio is not constant over the duration of animation.

7. The method of claim 1, wherein the animation sequence has a rewinding nature to display recent objects prior to older objects from the group of objects.

8. The method of claim 1, wherein additional information is stored with the date property about the time an object was appended to the group of objects, to enable sequencing by order of entry into group.

9. The method of claim 1, wherein said graphical user interface computer system is implemented as a portable device for hand held operation.

10. The method of claim 1, wherein said storage means comprises of a plurality of storage media to store the contained objects.

11. The method of claim 1, wherein said storage means is a remote storage means and is accessed by the computer using a network connection.

12. In a graphical user interface computer system, a method to browse a container movie icon containing frame icons of temporally related objects, stored in a storage means accessible to the computer system, comprising the steps of
   a. a display programmed means to prominently display within the movie icon, only one predetermined active frame icon, and
   b. to access other non-prominently displayed frame icons or hidden frame icons, a programmed means to animate frame icons in the movie icon region, with a user pausing ability and direction control, such that the animated sequence is related to a date order of said temporally related objects, whereby a user is forced to feel the temporal relationship of frame icons before launching an object, preventing hasty pointing actions toward non-active icons and at the same time, enabling intuitive access to any frame icon when required.

* * * * *